(12) United States Patent
Hashimura et al.

(10) Patent No.: US 11,345,294 B2
(45) Date of Patent: May 31, 2022

(54) VEHICLE STRUCTURE AND METHOD FOR MANUFACTURING THE SAME

(71) Applicant: KOBE STEEL, LTD., Hyogo (JP)

(72) Inventors: Toru Hashimura, Kobe (JP); Taiki Yamakawa, Kobe (JP); Yasuhiro Maeda, Kobe (JP); Kenichi Watanabe, Kobe (JP); Junya Naito, Kobe (JP); Akihiko Tatsumi, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 129 days.

(21) Appl. No.: 16/954,923

(22) PCT Filed: Dec. 14, 2018

(86) PCT No.: PCT/JP2018/046077
§ 371 (c)(1),
(2) Date: Jun. 17, 2020

(87) PCT Pub. No.: WO2019/138781
PCT Pub. Date: Jul. 18, 2019

(65) Prior Publication Data
US 2020/0377046 A1    Dec. 3, 2020

(30) Foreign Application Priority Data

Jan. 15, 2018 (JP) .............................. JP2018-004391

(51) Int. Cl.
*B60R 19/04* (2006.01)
*B23P 19/02* (2006.01)
(Continued)

(52) U.S. Cl.
CPC .............. *B60R 19/04* (2013.01); *B23P 19/02* (2013.01); *B60R 19/18* (2013.01); *B60R 19/24* (2013.01)

(58) Field of Classification Search
CPC ......... B60R 19/04; B60R 19/18; B60R 19/24; B23P 19/02
See application file for complete search history.

(56) References Cited

U.S. PATENT DOCUMENTS 11,148,719 B2 * 10/2021 Hashimura ............. B60R 19/18
2010/0289300 A1    11/2010 Kokubo
(Continued)

FOREIGN PATENT DOCUMENTS

| JP | 2008-068849 A | 3/2008 |
| JP | 2009-096459 A | 5/2009 |

(Continued)

OTHER PUBLICATIONS

The extended European search report issued by the European Patent Office dated Sep. 6, 2021, which corresponds to European Patent Application No. 18899999.9-1132 and is related to U.S. Appl. No. 16/954,923.

(Continued)

*Primary Examiner* — D Glenn Dayoan
*Assistant Examiner* — Melissa Ann Bonifazi
(74) *Attorney, Agent, or Firm* — Studebaker & Brackett PC (57) ABSTRACT

A vehicle structure includes a first member that extends in a vehicle width direction, second members that extend in a front-back direction that are inserted in the front-back direction with respect to the first member, and third members that are arranged at end portions of the first member in the vehicle width direction and joined to the end portions.

9 Claims, 7 Drawing Sheets (51) Int. Cl.
 *B60R 19/18* (2006.01)
 *B60R 19/24* (2006.01)

(56) References Cited

U.S. PATENT DOCUMENTS

2012/0267908 A1* 10/2012 Kokubo .................. B60R 19/34
 293/133
2018/0306221 A1 10/2018 Hashimura et al.

FOREIGN PATENT DOCUMENTS

JP 2011-230768 A 11/2011
WO WO-2017065231 A * 4/2017 ............. B21D 39/06

OTHER PUBLICATIONS

International Preliminary Report On Patentability and Written Opinion issued in PCT/JP2018/046077; dated Jul. 30, 2020.
International Search Report issued in PCT/JP2018/046077; dated Feb. 19, 2019.

* cited by examiner

VEHICLE STRUCTURE AND METHOD FOR MANUFACTURING THE SAME

CROSS-REFERENCE TO RELATED APPLICATIONS

This is a national phase application in the United States of International Patent Application No. PCT/JP2018/046077 with an international filing date of Dec. 14, 2018, which claims priorities of Japanese Patent Application 2018-004391 filed on Jan. 15, 2018 the contents of which are incorporated herewith by reference.

TECHNICAL FIELD

The present invention relates to a vehicle structure used for a vehicle and a method for manufacturing the same, and more particularly to a bumper structure used for an automobile, or the like, and a method for manufacturing the same.

BACKGROUND ART

In recent years, automobile crash standards have become stricter, and one of the most recent issues is to reduce damage to an automobile and an occupant in a case where an offset crash has occurred during high-speed traveling of the automobile. Specifically, a small offset crash test is stipulated in which an automobile is caused to crash into a barrier jig at a predetermined speed in a state where a predetermined amount of overlap with respect to a vehicle width of the automobile is provided. Then, in the test described above, a standard of the amount of overlap with respect to the vehicle width of the automobile has been strengthened from conventional 40% to 15%, and the crash speed has become faster than before, for example, from 50 km/h to 64 km/h.

SUMMARY OF THE INVENTION

Problems to be Solved by the Invention

However, a bumper structure as disclosed in JP 2009-96459 A is usually designed to withstand a crash load mainly from a front, and is not designed with sufficient consideration for the high-speed offset crash described above.

Here, in order to deal with the offset load described above, it is conceivable to simply increase a length of the bumper structure in a vehicle width direction. However, for example, in a case where the bumper structure is an aluminum extruded material, there is a limit to an extension amount in the vehicle width direction due to problems that a bending length increases and bending curvature decreases. Furthermore, because a cross section of an extruded material is uniform in the vehicle width direction, it is necessary to increase a size of a bumper beam itself or increase thickness of the bumper beam to improve strength in order to impose a large load only on an end portion, which, however, increases overall weight of the bumper structure.

Furthermore, in a case where the bumper structure is a steel press-formed product, a deep and long bent shape is highly difficult to process, and in order to greatly improve strength of the end portion, it is necessary to apply a patch, or the like. Furthermore, in a case where the bumper structure is a steel roll-formed product, a problem similar to those with an extruded material occurs.

Therefore, an object of the present invention is to provide a vehicle structure capable of improving strength against an offset load with a simple configuration and a method for manufacturing the same.

Means for Solving the Problems

A first aspect of the present invention is a vehicle structure including a first member that extends in a vehicle width direction,
   a second member that extends in a front-back direction that is inserted in the front-back direction with respect to the first member, and
   a third member that is arranged at an end portion of the first member in the vehicle width direction and joined to the end portion.

According to the configuration, strength against an offset load can be improved by a simple configuration in which the third member is joined to the end portion of the first member in the vehicle width direction.

The first aspect preferably further includes the following configurations.

(1) The third member is arranged so as to overlap the second member in the front-back direction.

According to the configuration (1), strength of the end portion of the first member in the vehicle width direction can be further improved by the third member being arranged so as to overlap the second member.

(2) A cross-sectional shape of the third member has a rectangular shape, and
   an overlap length between the third member and the first member is three times or more a length of a short side of a cross section of the third member.

According to the configuration (2), joint strength between the first member and the third member can be improved by setting the overlap length between the third member and the first member to a predetermined length or more.

(3) The third member is inserted into the first member from the end portion of the first member inward in the vehicle width direction of the first member,
   the second member is inserted into the first member and the third member from the front-back direction, an insertion part of the second member into the first member and the third member is tube-expanded, and the second member is joined by press-fitting to the first member and the third member.

According to the configuration (3), by tube-expanding the insertion part of the second member and joining by press-fitting the second member to the first member and the third member, strength of joint parts between the first member, the second member, and the third member can be improved.

A second aspect of the present invention is a method for manufacturing a vehicle structure, the method including preparing a first member that extends in a vehicle width direction, a second member that extends in a front-back direction, and a third member that extends in the vehicle width direction,
   arranging the third member at an end portion of the first member in the vehicle width direction and joining the third member to the end portion, and
   inserting the second member into the first member and the third member from the front-back direction.

According to the configuration, a vehicle structure can be manufactured in which strength against an offset load is improved.

The second aspect preferably further includes the following configurations.

(4) The method further includes inserting the third member into the first member from the end portion of the first member in the vehicle width direction inward in the vehicle width direction of the first member, and joining by press-fitting the second member into the first member and the third member by tube-expanding the insertion part of the second member into the first member and the third member.

According to the configuration (4), it is possible to manufacture a vehicle structure in which strength of joint parts of the first member, the second member, and the third member are improved.

According to the present invention, it is possible to provide a vehicle structure capable of improving strength against an offset load with a simple configuration and a method for manufacturing the same.

DESCRIPTION OF EMBODIMENTS

An embodiment of the present invention will be described below with reference to the accompanying drawings.

Figure 1:
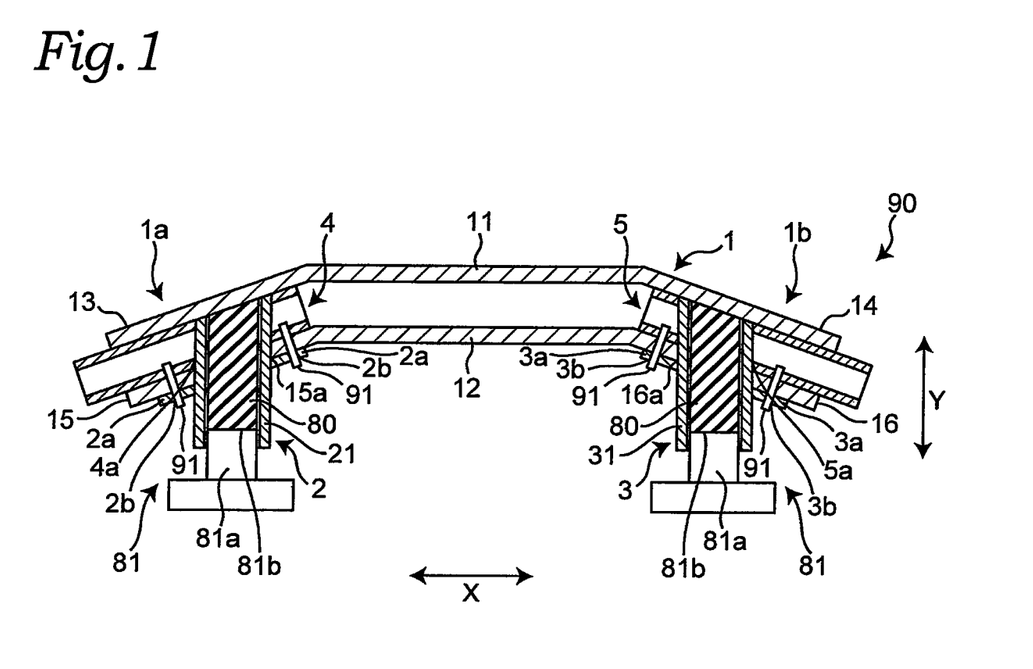
FIG. 1 is a horizontal cross-sectional view of a vehicle structure according to one embodiment of the present invention.

FIG. 1 is a horizontal cross-sectional view of a vehicle structure 90 according to one embodiment of the present invention, and in the present embodiment, the vehicle structure 90 is a bumper structure, and a vehicle width direction of a vehicle corresponds to an X direction, and a front-back direction of the vehicle corresponds to a Y direction.

As illustrated in FIG. 1, the vehicle structure 90 includes a first member (bumper beam) 1 that extends in the vehicle width direction (X direction), and second members (bumper stays) 2, 3 that extend in the front-back direction (Y direction) of the vehicle and are inserted into the bumper beam 1 in the Y direction. The bumper stays 2, 3 are configured to connect the bumper beam 1 to a vehicle frame (not illustrated).

The bumper beam 1 has a hollow shape and a perpendicular cross section in a rectangular shape. The bumper beam 1 includes a front wall 11 positioned on a front side when attached to the vehicle, a back wall 12 arranged parallel with the front wall 11 and positioned on a back side, two front oblique walls 13, 14 that extend obliquely outward in the vehicle width direction from both end portions of the front wall 11 in the vehicle width direction, and two back oblique walls 15, 16 that extend obliquely outward in the vehicle width direction from both end portions of the back wall 12 in the vehicle width direction, the back oblique walls 15, 16 being arranged in parallel with the front oblique walls 13, 14.

The back oblique wall 15 has a hole part 15a into which the bumper stay 2 is inserted, and the back oblique wall 16 has a hole part 16a into which the bumper stay 3 is inserted.

The bumper stays 2, 3 have tube parts 21, 31 having a hollow shape as insertion parts to be inserted into the bumper beam 1, and are joined by press-fitting to the bumper beam 1. As an example of joint by press-fitting, elastic bodies (rubbers) 80 inserted into the tube parts 21, 31 of the bumper stays 2, 3 are compressed in the Y direction by pressers 81, the rubbers 80 are swelled in a direction orthogonal to a compression direction, and the tube parts 21, 31 of the bumper stays 2, 3 are tube-expanded. The bumper stays 2, 3 are joined by press-fitting to the bumper beam 1 by being tube-expanded.

The bumper beam 1 and the bumper stays 2, 3 are each made of an extruded material of aluminum alloy.

As the material of a rubber 80, it is preferable to use any one of, for example, urethane rubber, chloroprene rubber, CNR rubber (chloroprene rubber+nitrile rubber), or silicone rubber. Furthermore, hardness of the rubber 80 is preferably 30 or more in Shore A.

A presser 81 is attached to a press device (not illustrated), and can compress the rubber 80 in the Y direction by being driven by the press device. The presser 81 has a projection 81a as a part that presses the rubber 80, and a pressing surface 81b that is an end surface of the projection 81a has a flat surface that is perpendicular to a projection direction (Y direction).

Figure 2:
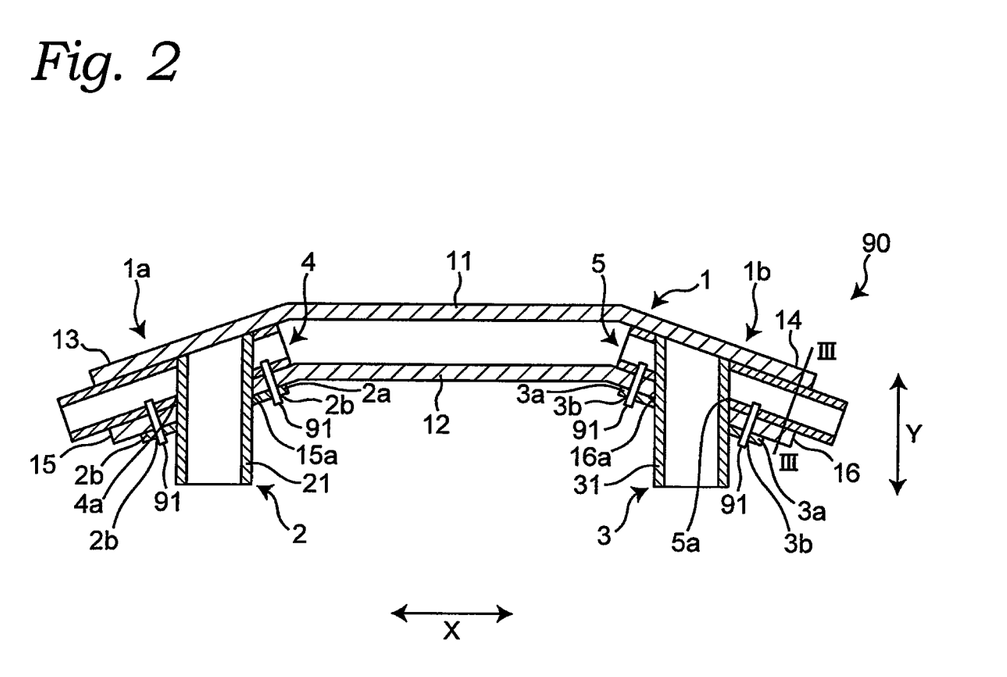
FIG. 2 is the horizontal cross-sectional view in FIG. 1 without rubbers and pressers.

FIG. 2 is the horizontal cross-sectional view in FIG. 1 without the rubbers 80 and the pressers 81. As illustrated in FIGS. 1 and 2, a vehicle structure 90 further has third members (reinforcement members) 4, 5, which are arranged at end portions 1a, 1b in the X direction of the bumper beam 1 and are joined to the end portions 1a, 1b. The reinforcement member 4 has a hollow shape and a perpendicular cross section in a rectangular shape. The reinforcement member 4 is inserted into the bumper beam 1 from the end portion 1a of the bumper beam 1 inward in the vehicle width direction of the bumper beam 1, and is joined to the end portion 1a so as to protrude outward in the X direction from an end surface of the end portion 1a of the bumper beam 1.

The reinforcement member 5 has a hollow shape and a perpendicular cross section in a rectangular shape. The reinforcement member 5 is inserted into the bumper beam 1 from the end portion 1b of the bumper beam 1 inward in the vehicle width direction of the bumper beam 1, and is joined to the end portion 1b so as to protrude outward in the X direction from an end surface of the end portion 1b of the bumper beam 1.

The reinforcement member 4 is inserted into the bumper beam 1 so as to overlap the bumper stay 2 when viewed from the Y direction. Similarly, the reinforcement member 5 is inserted into the bumper beam 1 so as to overlap the bumper stay 3 when viewed from the Y direction. Therefore, when the bumper stays 2, 3 are tube-expanded by the rubbers 80 inserted in the tube parts 21, 31 of the bumper stays 2, 3, the bumper stay 2 is joined by press-fitting to the bumper beam 1 via the reinforcement member 4, and the bumper stay 3 is joined by press-fitting to the bumper beam 1 via the reinforcement member 5. The reinforcement member 4 has a hole part 4a into which the bumper stay 2 is inserted, and the reinforcement member 5 has a hole part 5a into which the bumper stay 3 is inserted.

The bumper stays 2, 3 have seat parts 2a and 3a that extend in the X direction, and the seat parts 2a, 3a include insertion holes 2b, 3b through which fixing bolts 91, which join the bumper stays 2, 3, the end portions 1a, 1b of the bumper beam 1, and the reinforcement members 4, 5, are inserted. By the fixing bolts 91, positions of the end portion 1a of the bumper beam 1 and the reinforcement member 4 with respect to the bumper stay 2 are fixed, and positions of the end portion 1b of the bumper beam 1 and the reinforcement member 5 with respect to the bumper stay 3 are fixed.

Figure 3:
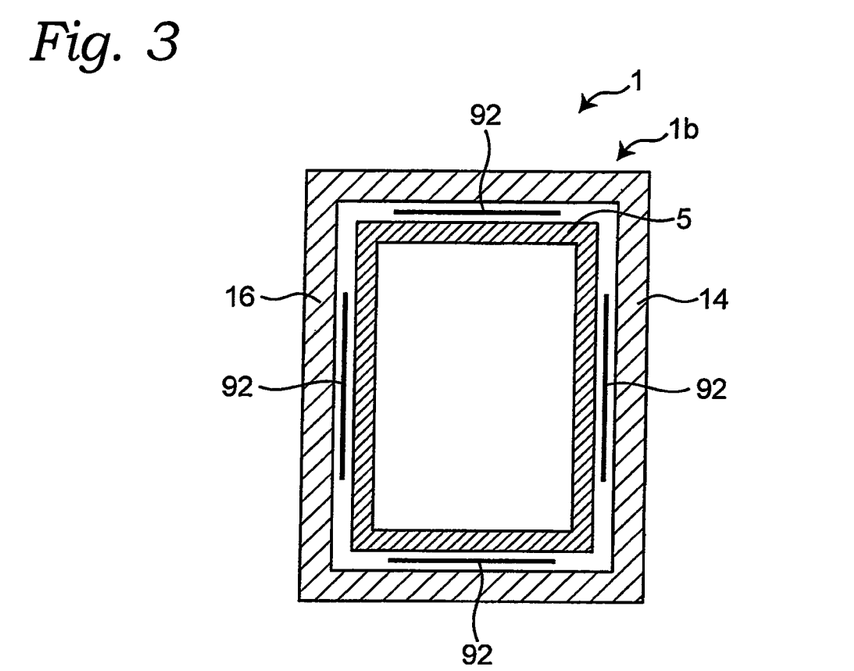
FIG. 3 is a cross-sectional view taken along line in FIG. 2.

FIG. 3 is a cross-sectional view taken along line III-III in FIG. 2. As illustrated in FIG. 3, adhesive 92 is arranged between the end portion 1b of the bumper beam 1 and the reinforcement member 5. In a case where material of the bumper beam 1 and material of the reinforcement member 5 are different members, it is preferable to arrange adhesive that is an insulation material, in consideration of potential difference corrosion between different members. Furthermore, also in a case where material of the bumper beam 1 and material of the reinforcement member 5 are the same material, it is preferable to arrange adhesive that is an insulation material in consideration of crevice corrosion. Note that a configuration similar to the above configuration is provided between the end portion 1a of the bumper beam 1 and the reinforcement member 4.

Figure 4:
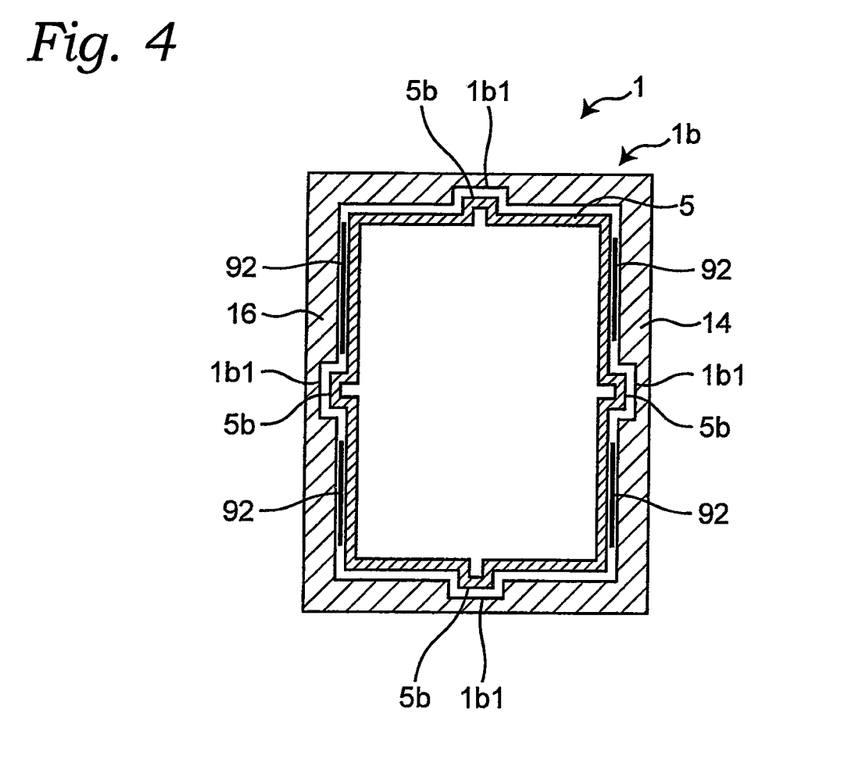
FIG. 4 is a diagram similar to FIG. 3, which illustrates a modification.

FIG. 4 is a diagram similar to FIG. 3, which illustrates a modification of the above embodiment. As illustrated in FIG. 4, key groove parts 1b1 recessed inward on a perpendicular cross section may be formed on an inner surface of the end portion 1b of the bumper beam 1. In that case, in the reinforcement member 5, a protrusion 5b that engages with a key groove part 1b1 is formed at a position facing the key groove part 1b1. By the protrusion 5b of the reinforcement member 5 engaging with the key groove part 1b1 of the end portion 1b of the bumper beam 1, positioning of the reinforcement member 5 in a circumferential direction with respect to the end portion 1b is possible. Further, by bending the end portion 1b in the Y direction, positioning of the reinforcement member 5 in the X direction with respect to the end portion 1b is possible. Furthermore, similarly to FIG. 3, the adhesive 92 is arranged between the end portion 1b of the bumper beam 1 and the reinforcement member 5. Note that a configuration similar to the above configuration is provided between the end portion 1a of the bumper beam 1 and the reinforcement member 4.

Figure 5:
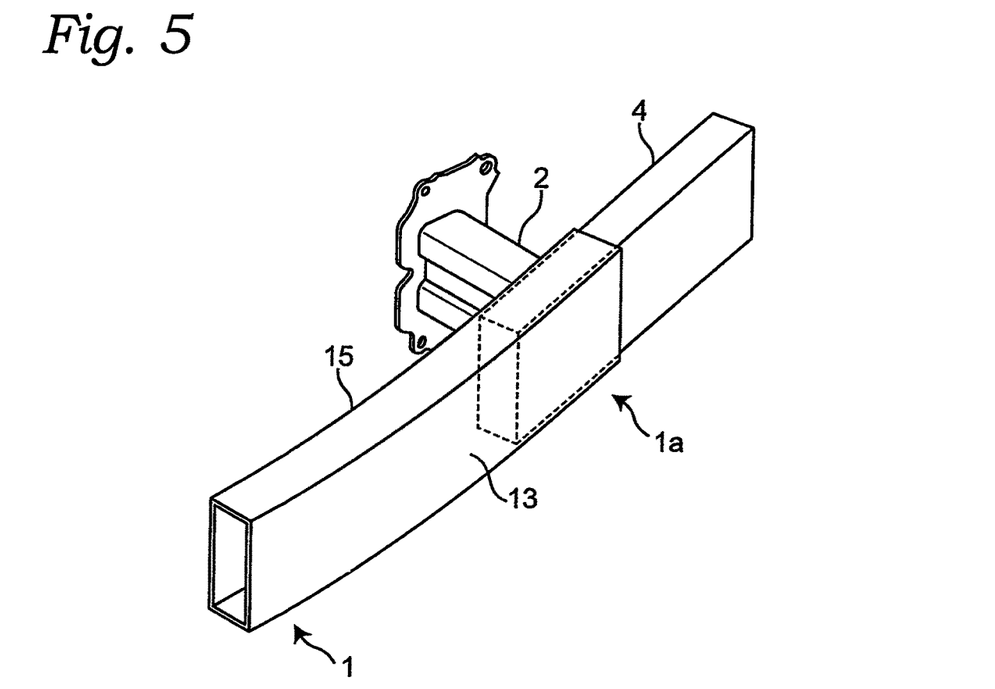
FIG. 5 is a perspective view of a part of the vehicle structure in FIG. 1.
Figure 6:
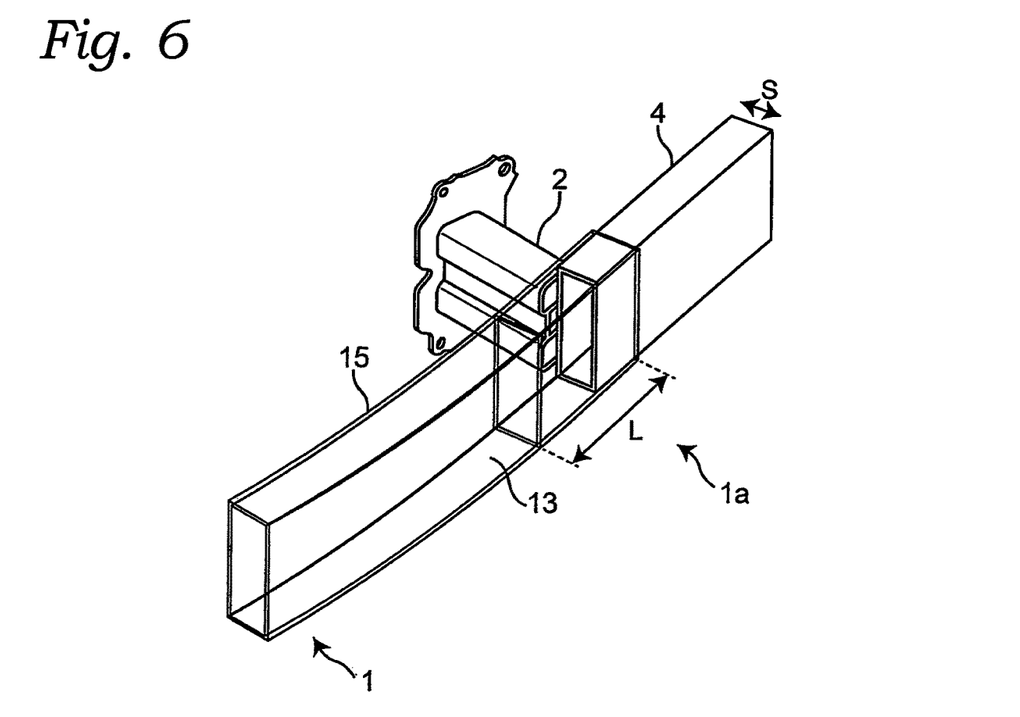
FIG. 6 is a partial perspective view of FIG. 4.

FIG. 5 is a perspective view of a part of the vehicle structure in FIG. 1, and FIG. 6 is a partial perspective view of FIG. 4. As illustrated in FIGS. 5 and 6, an overlap amount L between the reinforcement member 4 and the bumper beam 1 formed by the reinforcement member 4 being inserted into the bumper beam 1 is three times or more a length of a short side S of a perpendicular cross section of the reinforcement member 4. Similarly, an overlap amount between the reinforcement member 5 and the bumper beam 1 formed by the reinforcement member 5 being inserted into the bumper beam 1 is three times or more a length of a short side of a perpendicular cross section of the reinforcement member 5.

[Method for Manufacturing Vehicle Structure]

Figure 7:
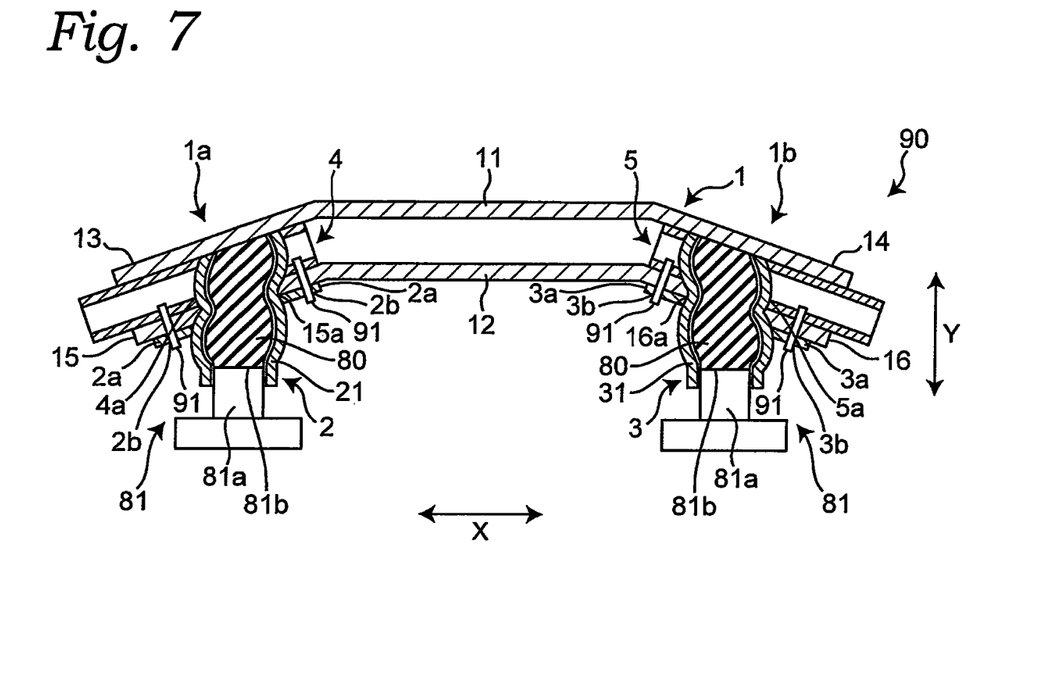
FIG. 7 is a horizontal cross-sectional view in which bumper stays are tube-expanded by rubbers.
Figure 8:
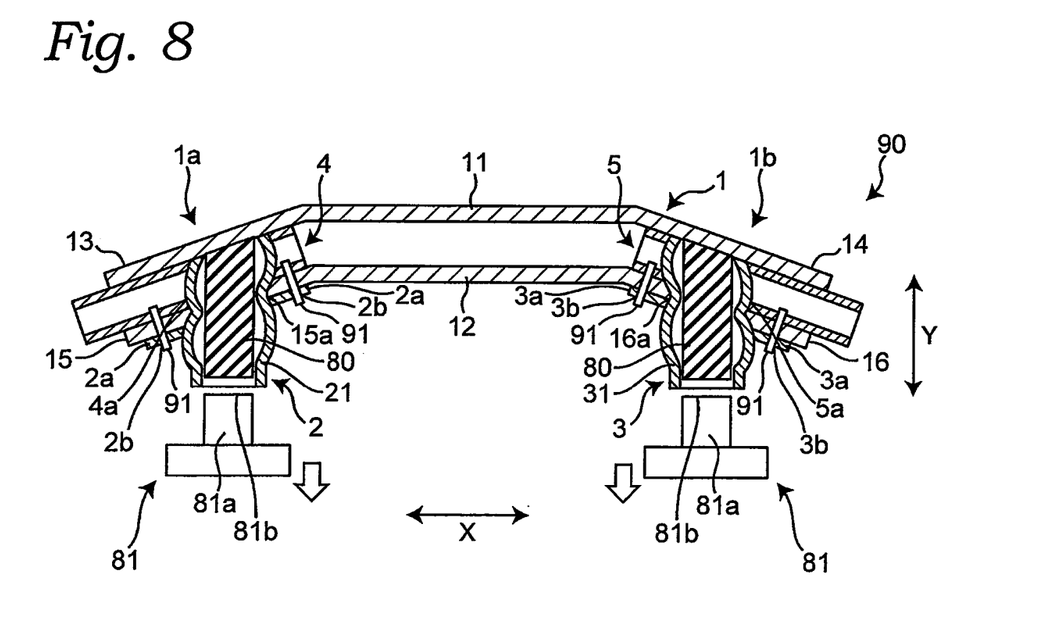
FIG. 8 is a horizontal cross-sectional view illustrating a state where compression of the rubbers is released.

Next, a method for manufacturing the vehicle structure 90 will be described mainly with reference to FIGS. 2, 7, and 8. FIG. 7 is a horizontal cross-sectional view in which the bumper stays 2, 3 are tube-expanded by the rubbers 80, and FIG. 8 is a horizontal cross-sectional view illustrating a state where compression of the rubbers 80 is released.

First, as illustrated in FIG. 2, the bumper beam 1, the bumper stays 2, 3, the reinforcement members 4, 5, and the rubbers 80 are prepared. Then, the reinforcement member 4 is inserted into the bumper beam 1 from the end portion 1a of the bumper beam 1 inward in the vehicle width direction of the bumper beam 1, and the reinforcement member 5 is inserted into the bumper beam 1 from the end portion 1b of the bumper beam 1 inward in the vehicle width direction of the bumper beam 1.

Next, the tube part 21 of the bumper stay 2 is inserted into the hole part 15a formed in the end portion 1a of the bumper beam 1. At this time, the tube part 21 of the bumper stay 2 penetrates the hole part 4a formed in the reinforcement member 4. Similarly, a tube part 31 of the bumper stay 3 is inserted into the hole part 16a formed in the end portion 1b of the bumper beam 1. At this time, the tube part 31 of the bumper stay 3 penetrates the hole part 5a formed in the reinforcement member 5. Then, the fixing bolts 91 are inserted into the insertion holes 2b, 3b of the bumper stay 2, positions of the end portion 1a of the bumper beam 1 and the reinforcement member 4 with respect to the bumper stay 2 are fixed, and positions of the end portion 1b of the bumper beam 1 and the reinforcement member 5 with respect to the bumper stay 3 are fixed. Here, in a case where the tube parts 21, 31 of the bumper stays 2, 3 are tube-expanded and joined by press-fitting to the bumper beam 1, the fixing bolts 91 and the seat parts 2a, 3a of the bumper stays 2, 3 (the insertion holes 2b, 3b through which the fixing bolts 91 are inserted are provided) may be unnecessary. Then, the rubbers 80 are inserted into the tube parts 21, 31 of the bumper stays 2, 3.

After the rubbers 80 are inserted, as illustrated in FIG. 7, projections of the pressers 81 are inserted into the tube parts 21, 31 of the bumper stays 2, 3, and the rubbers 80 are compressed in the Y direction to swell in a direction orthogonal to a compression direction, by which the tube parts 21, 31 of the bumper stays 2, 3 are tube-expanded. The bumper stays 2, 3 are joined by press-fitting to the reinforcement members 4, 5 and the bumper beam 1 by the tube expansion.

After the bumper stays 2, 3 are joined by press-fitting, as illustrated in FIG. 8, the compression of the rubbers 80 by the pressers 81 is released. The rubbers 80 from which compressive force is removed restore to an original shape by elastic force of own. Therefore, the rubbers 80 can be easily taken out of the bumper stays 2, 3.

A member inserted into the tube parts 21, 31 of the bumper stays 2, 3 is not limited to a rubber 80, and, for example, a fluid sealing member in which gas or liquid is sealed may be used instead of rubber. Any member can be used as long as the member swells outward by application of compressive force and can tube-expand a tube part of a bumper stay. Note that, it is preferable that the member be a member that is evenly deformed like rubber when swelling outward by application of compressive force.

With the vehicle structure 90 having the above-described configuration, the following effects can be exhibited.

(1) It is possible to provide a vehicle structure 90 with improved strength against an offset load by a simple configuration in which the reinforcement members 4, 5 are joined to the end portions 1a, 1b of the bumper beam 1 in the vehicle width direction.

(2) It is possible to further improve strength of the end portions 1a, 1b of the bumper beam 1 in the vehicle width direction by, when viewed from the front-back direction, the reinforcement member 4 being arranged so as to overlap the bumper stay 2 and the reinforcement member 5 being arranged so as to overlap the bumper stay 3.

(3) It is possible to improve joint strength between the bumper beam 1 and the reinforcement members 4, 5 by setting an overlap length L between the reinforcement members 4, 5 and the bumper beam 1 to a predetermined length or more, that is, three times or more a length of a short side S of a perpendicular cross section of the reinforcement members 4, 5.

(4) It is possible to improve strength of joint parts between the bumper beam 1, the bumper stays 2, 3, and the reinforcement members 4, 5 by tube-expanding the tube parts 21, 31 of the bumper stays 2, 3 and joining by press-fitting the bumper stays 2, 3 to the bumper beam 1 and the reinforcement members 4, 5.

(5) The tube parts 21, 31 of the bumper stays 2, 3 are tube-expanded by the rubbers 80. Here, because the rubbers 80 are isotropically deformable, the tube parts 21, 31 of the bumper stays 2, 3 can be evenly tube-expanded. As a result, local load on the tube parts 21, 31 of the bumper stays 2, 3 can be reduced, and local deformation of the tube parts 21, 31 can be prevented. Therefore, joint by press-fitting using a rubber 80 enables the bumper beam 1, the bumper stays 2, 3, and the reinforcement members 4, 5 to be fitted with high accuracy compared to another joining method, and can improve joint strength between the bumper beam 1, the bumper stays 2, 3, and the reinforcement members 4, 5.

(6) By the fixing bolts 91, positions of the end portion 1$a$ of the bumper beam 1 and the reinforcement member 4 with respect to the bumper stay 2 can be fixed, and positions of the end portion 1$b$ of the bumper beam 1 and the reinforcement member 5 with respect to the bumper stay 3 can be fixed. Then, also when the bumper stays 2, 3 are tube-expanded by the rubbers 80, shifting of positions of the bumper beam 1 and the reinforcement members 4, 5 with respect to the bumper stays 2, 3 can be prevented.

(7) It is possible to suppress potential difference corrosion or crevice corrosion between the bumper beam 1 and the reinforcement members 4, 5, because the adhesive 92 is arranged between the end portions 1$a$, 1$b$ of the bumper beam 1 and the reinforcement members 4, 5.

(Modification)

Figure 9:
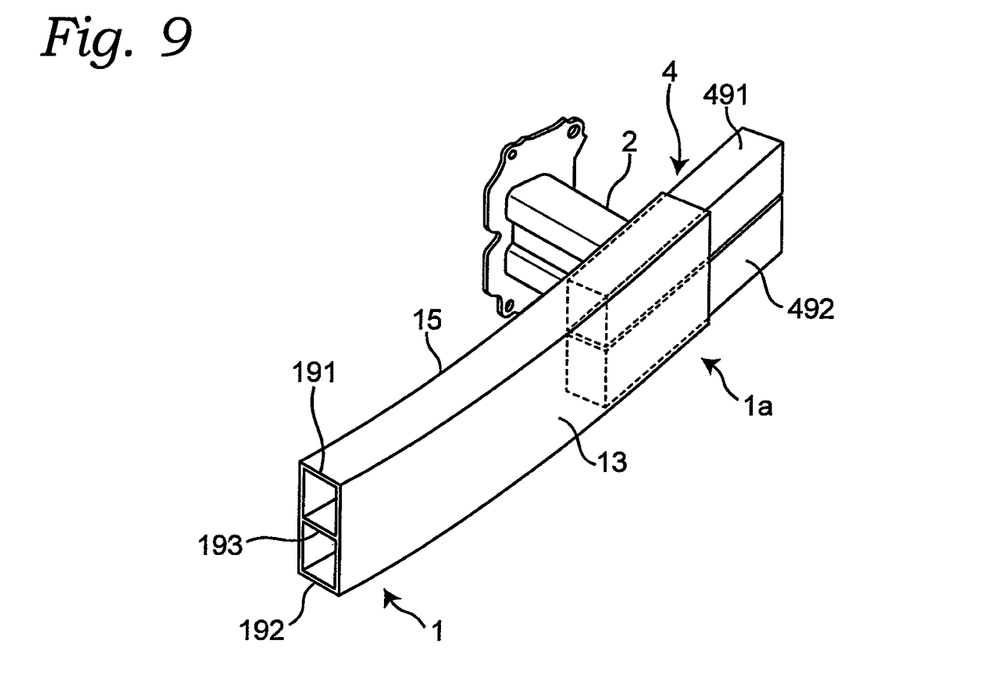
FIG. 9 is a perspective view of a part of a vehicle structure of a modification in which a bumper beam is configured by two tube bodies being connected.

In the above embodiment, the bumper beam 1 is configured by one tube, and a cross-sectional shape of the bumper beam 1 is a shape that has one space inside, and each of the reinforcement members 4, 5 is correspondingly configured by one tube body, and a cross-sectional shape of the reinforcement members 4, 5 is a shape that has one space inside. However, the bumper beam 1 and the reinforcement members 4, 5 are not limited to the above, and may include a plurality of tube bodies. FIG. 9 is a perspective view of a part of a vehicle structure of a modification in which the bumper beam 1 is configured by two tube bodies being connected, and FIG. 10 is a partial perspective view of FIG. 9.

Figure 10:
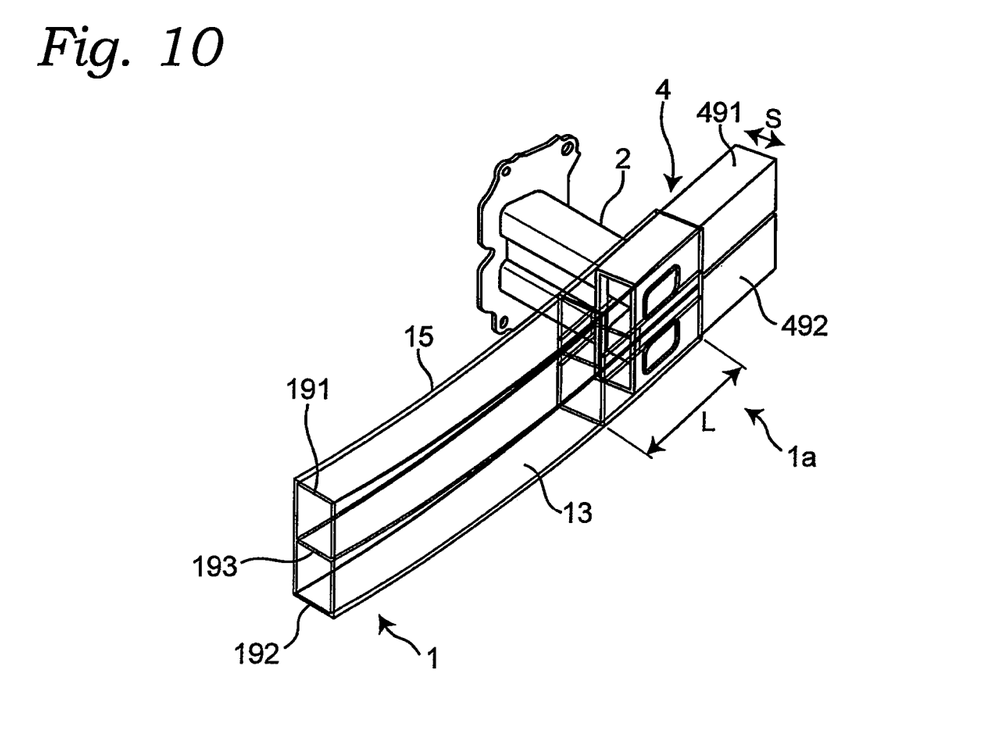
FIG. 10 is a partial perspective view of FIG. 9.

As illustrated in FIGS. 9 and 10, the bumper beam 1 is configured by two tube bodies 191, 192 that extend in the vehicle width direction being arranged vertically, and the tube body 191 and the tube body 192 being connected by a connection wall 193. Accordingly, the reinforcement member 4 is provided with two tube bodies 491, 492 that extend in the vehicle width direction being arranged vertically. Then, the tube body 491 of the reinforcement member 4 is inserted into the tube body 191 of the bumper beam 1 from the end portion 1$a$ of the bumper beam 1 inward in the vehicle width direction of the bumper beam 1, and the tube body 492 of the reinforcement member 4 is inserted into the tube body 192 of the bumper beam 1 from the end portion 1$a$ of the bumper beam 1 inward in the vehicle width direction of the bumper beam 1. The reinforcement member 5 is also configured similarly to the reinforcement member 4, and is similarly inserted from the end portion 1$b$ of the bumper beam 1 inward in the vehicle width direction of the bumper beam 1.

According to the above configuration, the bumper beam 1 is configured by the tube body 191 and the tube body 192 being connected by the connection wall 193, so that the connection wall 193 can improve structural strength of the bumper beam 1, and as a result, strength against an offset load can be further improved at the end portions 1$a$, 1$b$ of the bumper beam 1, into which the reinforcement members 4, 5 are inserted.

Figure 11:
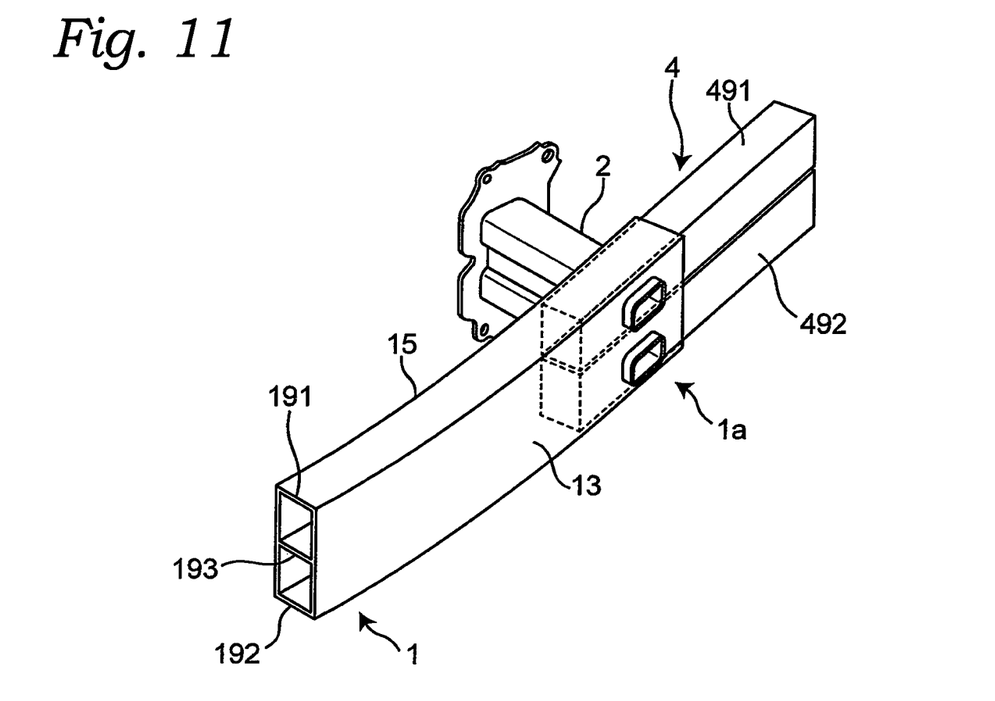
FIG. 11 is a perspective view of a part of the vehicle structure of the modification in FIG. 9.
Figure 12:
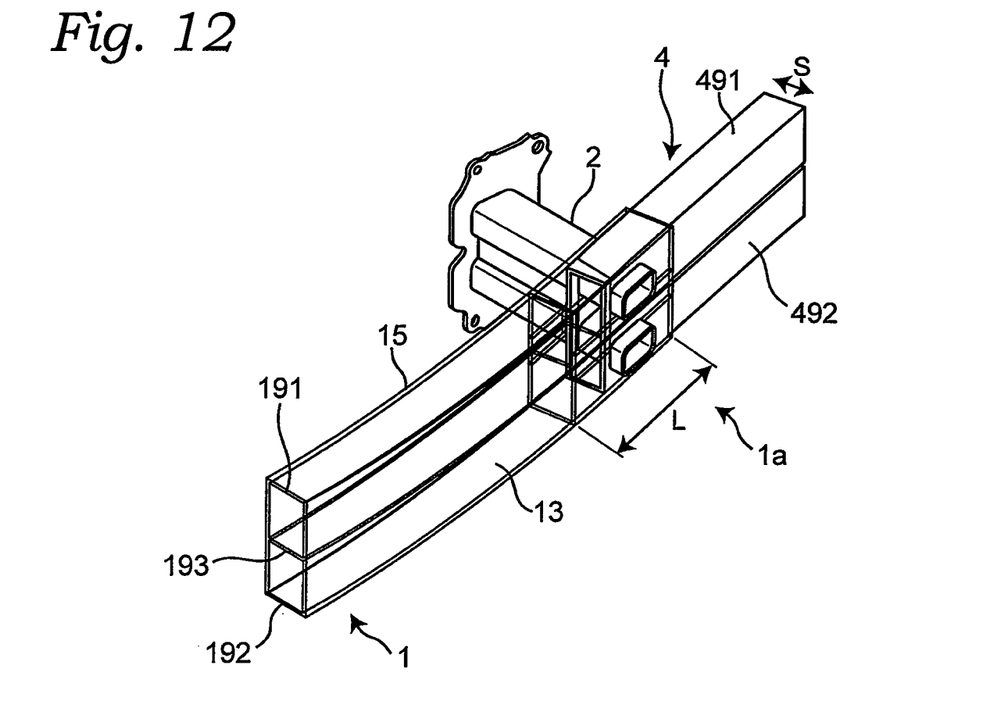
FIG. 12 is a partial perspective view of FIG. 11.

FIG. 11 is a perspective view of a part of the vehicle structure of the modification in FIG. 9, and FIG. 12 is a partial perspective view of FIG. 11. As illustrated in FIGS. 11 and 12, the bumper stay 2 is configured to penetrate not only the back oblique wall 15 of the bumper beam 1 but also the front oblique wall 13. Similarly, the bumper stay 3 is configured to penetrate not only the back oblique wall 16 of the bumper beam 1 but also the front oblique wall 14.

According to the above configuration, because the bumper stays 2, 3 are configured to penetrate the back oblique walls 15, 16 and front oblique walls 13, 14 of the bumper beam 1, joint strength between the bumper stays 2, 3, the reinforcement members 4, 5, and the bumper beam 1 can be improved by press-fitting the bumper stays 2, 3. As a result, the strength against an offset load can be further improved at the end portions 1$a$, 1$b$ of the bumper beam 1, into which the reinforcement members 4, 5 are inserted.

Figure 13:
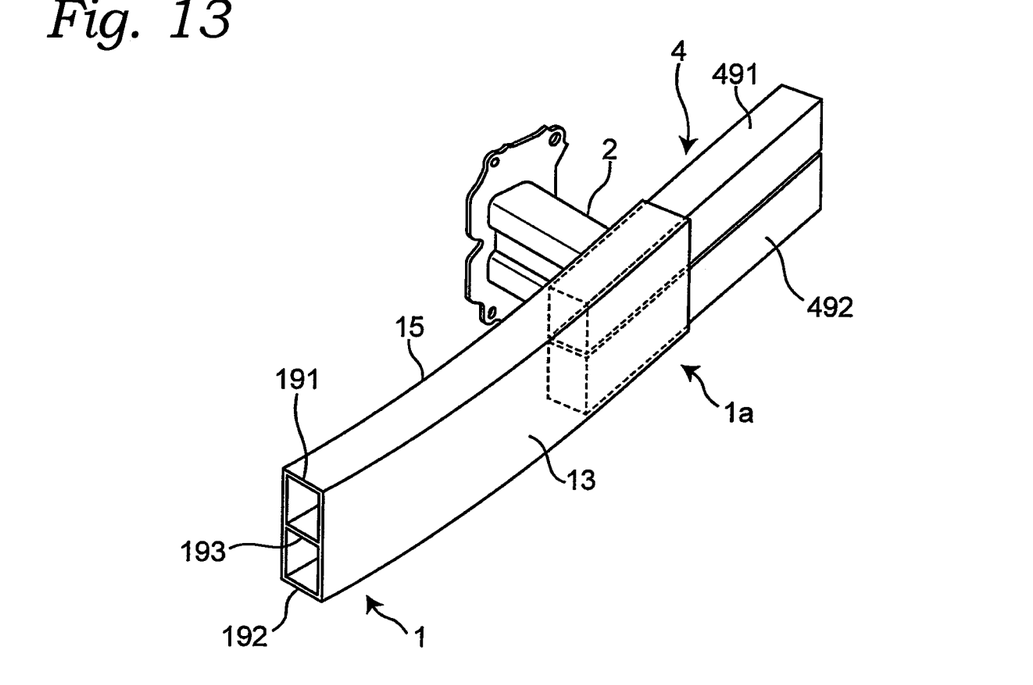
FIG. 13 is a perspective view of a part of the vehicle structure of the modification in FIG. 9.
Figure 14:
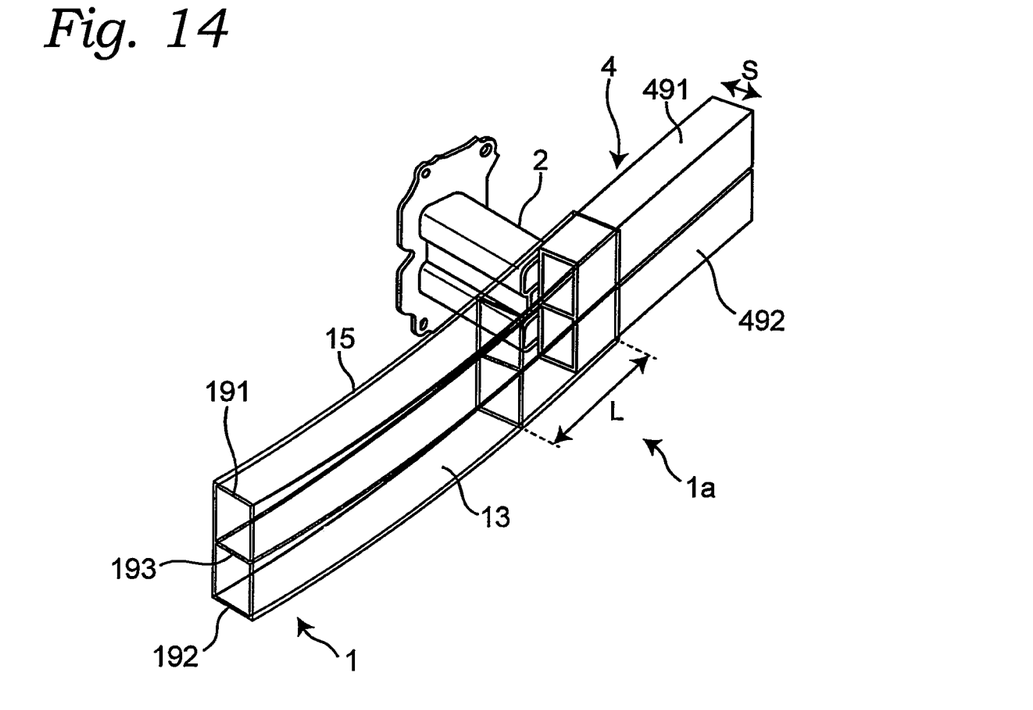
FIG. 14 is a partial perspective view of FIG. 13.

FIG. 13 is a perspective view of a part of the vehicle structure of the modification in FIG. 9, and FIG. 14 is a partial perspective view of FIG. 13. As illustrated in FIGS. 13 and 14, the bumper stay 2 is configured to penetrate the back oblique wall 15 of the bumper beam 1 and not to penetrate the reinforcement member 4. Similarly, the bumper stay 3 is configured to penetrate the back oblique wall 16 of the bumper beam 1 and not to penetrate the reinforcement member 5.

According to the above configuration, because the bumper stays 2, 3 penetrate the back oblique walls 15, 16 of the bumper beam 1 and do not penetrate the reinforcement members 4, 5, lengths of the bumper stays 2, 3 can be shortened by which weight of the vehicle structure 90 can be reduced. Furthermore, it is possible to reduce an effect of joining by press-fitting the bumper stays 2, 3 to the bumper beam 1 on joint between the bumper beam 1 and the reinforcement members 4, 5.

As illustrated in FIGS. 9 to 14, in a case where the bumper beam 1 is configured by the two tube bodies 191, 192 that extend in the vehicle width direction being vertically arranged, and the tube body 191 and the tube body 192 being connected by the connection wall 193, the connection wall 193 is present at a central part in the vertical direction, in a cross section. At this time, usually, two each of the reinforcement members 4, 5 are provided. However, it is also possible to reinforce only one tube body of the bumper beam 1 and to have one each of the reinforcement members 4, 5. Furthermore, it is also possible to remove the connection wall 193 of the bumper beam 1 only at parts where the reinforcement members 4, 5 are inserted and to have one each of the reinforcement members 4, 5.

Although the reinforcement members 4, 5 are arranged at the end portions 1$a$, 1$b$ by being inserted into the end portions 1$a$, 1$b$ of the bumper beam 1 in the above embodiment, a reinforcement member may be arranged at an end portion of a bumper beam by the end portion of the bumper beam being inserted into an inside of the reinforcement member.

Although the reinforcement members 4, 5 are provided at both end portions 1*a*, 1*b* of the bumper beam 1 in the above embodiment, a reinforcement member may be arranged at either one end portion of the bumper beam 1.

Although the reinforcement members 4, 5 are arranged so as to protrude from the end portions 1*a*, 1*b* of the bumper beam 1 outward in the vehicle width direction in the above embodiment, the reinforcement members 4, 5 may be arranged so as not to protrude from the end portions 1*a*, 1*b* of the bumper beam 1.

Although the bumper beam 1 and the reinforcement members 4, 5 are joined by the bumper stays 2, 3 being joined by press-fitting to the bumper beam 1 in the above embodiment, the bumper beam 1 and the reinforcement members 4, 5 may be joined by riveting, welding, adhesive, or key groove bending. Furthermore, rubber press-fitting is described as an example of joint by press-fitting in the above embodiment, hydro press-fitting or electromagnetic press-fitting may be applied Although the above embodiment is described taking a bumper structure as the vehicle structure 90 by way of example, the present invention is not limited to a bumper structure and can be widely applied to a vehicle structure used in a vehicle.

The present invention is not limited to the configurations described in the above embodiment, and can include various modifications conceivable by a person skilled in the art without departing from the content described in the claims.

The invention claimed is:

1. A vehicle structure comprising:
a first member that extends in a vehicle width direction;
a second member that extends in a front-back direction and is inserted in the front-back direction with respect to the first member; and
a third member that is arranged at an end portion of the first member in the vehicle width direction, protrudes outward in the vehicle width direction from the end portion of the first member, and is joined to the end portion.

2. The vehicle structure according to claim 1, wherein the third member is arranged so as to overlap the second member in the front-back direction.

3. The vehicle structure according to claim 1, wherein a cross-sectional shape of the third member has a rectangular shape, and an overlap length between the third member and the first member is three times or more a length of a short side of a cross section of the third member.

4. The vehicle structure according to claim 1, wherein
the third member is inserted into the first member from the end portion of the first member inward in the vehicle width direction of the first member,
the second member is inserted into the first member and the third member from the front-back direction, an insertion part of the second member into the first member and the third member is tube-expanded, and the second member is joined by press-fitting to the first member and the third member.

5. A method for manufacturing a vehicle structure, the method comprising:
preparing a first member that extends in a vehicle width direction, a second member that extends in a front-back direction, and a third member that extends in the vehicle width direction;
arranging the third member at an end portion of the first member in the vehicle width direction and joining the third member to the end portion; and
inserting the second member into the first member and the third member from the front-back direction.

6. The method for manufacturing a vehicle structure according to claim 5, comprising:
inserting the third member into the first member from the end portion of the first member in the vehicle width direction inward in the vehicle width direction of the first member; and
joining by press-fitting the second member into the first member and the third member by tube-expanding an insertion part of the second member into the first member and the third member.

7. The vehicle structure according to claim 3, wherein
the third member is inserted into the first member from the end portion of the first member inward in the vehicle width direction of the first member,
the second member is inserted into the first member and the third member from the front-back direction, an insertion part of the second member into the first member and the third member is tube-expanded, and the second member is joined by press-fitting to the first member and the third member.

8. The vehicle structure according to claim 2, wherein
the third member is inserted into the first member from the end portion of the first member inward in the vehicle width direction of the first member,
the second member is inserted into the first member and the third member from the front-back direction, an insertion part of the second member into the first member and the third member is tube-expanded, and the second member is joined by press-fitting to the first member and the third member.

9. The vehicle structure according to claim 1, wherein the end portion of the first member and the third member are joined by a fixing bolt.

\* \* \* \* \*